United States Patent
Hebert et al.

(10) Patent No.: US 8,992,851 B2
(45) Date of Patent: Mar. 31, 2015

(54) CONTINUOUS FLOW WATER TREATMENT DEVICES AND METHODS

(75) Inventors: Marten Hebert, Phoenix, AZ (US); Clifford Oleksiew, North Vancouver (CA)

(73) Assignee: 0832521 B.C. Ltd., West Vancouver (CA)

( * ) Notice: Subject to any disclaimer, the term of this patent is extended or adjusted under 35 U.S.C. 154(b) by 1136 days.

(21) Appl. No.: 12/679,313

(22) PCT Filed: Sep. 19, 2008

(86) PCT No.: PCT/CA2008/001640
§ 371 (c)(1),
(2), (4) Date: Jul. 13, 2010

(87) PCT Pub. No.: WO2009/036558
PCT Pub. Date: Mar. 26, 2009

(65) Prior Publication Data
US 2010/0270240 A1    Oct. 28, 2010

(30) Foreign Application Priority Data
Sep. 21, 2007   (CA) .................................... 2603560

(51) Int. Cl.
| C02F 1/72 | (2006.01) |
| B01F 5/04 | (2006.01) |
| B01F 5/16 | (2006.01) |
| C02F 1/66 | (2006.01) |
| C02F 101/30 | (2006.01) |

(52) U.S. Cl.
CPC ............... *C02F 1/722* (2013.01); *B01F 5/0473* (2013.01); *B01F 5/16* (2013.01); *C02F 1/66* (2013.01); *C02F 2101/30* (2013.01); *C02F 2303/04* (2013.01); *C02F 2305/026* (2013.01)
USPC .......................... 422/226; 210/759; 210/763

(58) Field of Classification Search
CPC ............ C02F 1/66; C02F 1/722; C02F 1/725; C02F 2101/30; C02F 2303/04; C02F 2305/02; C02F 2305/023; C02F 2305/026; B01F 5/0473; B01F 5/16
USPC .................. 210/759, 763, 765; 422/225, 226
See application file for complete search history.

(56) References Cited

U.S. PATENT DOCUMENTS

| 5,573,676 | A | * | 11/1996 | Massholder et al. | ........... | 210/720 |
| 6,024,875 | A | * | 2/2000 | Sevic | ............... | 210/614 |
| 6,139,755 | A | * | 10/2000 | Marte et al. | .................... | 210/759 |
| 6,368,511 | B1 | * | 4/2002 | Weissenberg et al. | ........ | 210/759 |

* cited by examiner

*Primary Examiner* — Lucas Stelling

(57) ABSTRACT

Continuous flow water treatment systems, devices and methods that reduce the costs associated with using oxidizing agents in water treatment by maximizing mixing energy with pressure of the solution in a continuous flow system. The systems comprise an inflow conduit that provides water to be treated to a mixing chamber in a housing, a first chemical injector mounted into either the inflow conduit or the housing that provides an oxidizing agent into the water flow, a driven impeller mounted within the mixing chamber that maintains the flow of fluid through the apparatus and provides agitation to the fluid within the mixing chamber, and an outflow conduit for expelling the treated water from the mixing chamber. The outflow conduit may be pressurized to increase the mixing energy in the mixing chamber.

10 Claims, 9 Drawing Sheets

CONTINUOUS FLOW WATER TREATMENT DEVICES AND METHODS

BACKGROUND OF THE INVENTION

1. Field of the Invention

The present invention relates to devices and methods of water treatment, and in particular to devices and methods of removing organic contaminants from water employing chemical oxidation in continuous flow processes.

2. Description of the Prior Art

Oxidation Technologies have been used in both drinking water treatment and wastewater treatment primarily as a main treatment process to organic contaminates. The use of oxidizers as listed in Table 1 herein, such as for example peroxide is well known, as is the use of UV and Hydroxyl Free Radical Technology. Oxidation is very effective in removal of carbon chains C17 organics and below. The main draw back is the relatively high cost of using these technologies since the dosages of the reactants is significant. However, when employed properly, the results are clean water comprising backbone structures of carbon, nitrogen and water, but without a hazardous waste stream to contend with.

The following table lists several oxidants that may be used in water treatment and their oxidation potential:

TABLE 1

| Oxidant | Oxidation Potential, V |
| --- | --- |
| Fluorine | 3.0 |
| Hydroxyl radical | 2.8 |
| Ozone | 2.1 |
| Hydrogen peroxide | 1.8 |
| Potassium permanganate | 1.7 |
| Chlorine dioxide | 1.5 |
| Chlorine | 1.4 |

As shown in preceding table, hydrogen peroxide is a relatively powerful oxidant. Also shown in the preceding table is the much more powerful hydroxyl radical, a type of free radical, which is second in the list only to fluorine in its oxidation potential. During oxidation processes, especially those involving hydroxyl and/or other free radicals, organic contaminants can be completely or nearly completely mineralized to carbon dioxide, oxygen, water, and a small amount of mineral acids or salts.

For example, hydroxyl radicals can destroy phenols, MTBE, BTEX (benzene-toluene-ethylbenzene-xylenes), pesticides, solvents, plasticizers, chelants, chloroethenes, petroleum hydrocarbons, BOD and COD (biochemical oxygen demand/chemical oxygen demand) contributing compounds, and virtually any other organic requiring treatment. Further, hydroxyl radicals can disinfect process waters and biological effluents, and can decompose amino acids.

Also, hydroxyl radicals can treat water containing chemical warfare agents (e.g., Sarin, Tabun, VX, GF, GX, Cyanide, Soman, mustard gas, etc.); pathogens & biological warfare agents (e.g., bacteria, viruses, anthrax, cryptosporidium, etc.); soil and water contaminants (e.g., MtBE, EtBE, BTEX, chlorinated solvents, DCA, TCA, haloalkanes, methylene chloride, NDMA, carbon tetrachloride, haloalkenes, vinyl chloride, DCE, TCE, PCE, chloroform, acetones, ketones, cyanides, acrylonitriles, phenols, formaldehyde, alcohols, glycol ethers, etc.); ordnance, propellants, and energetic compounds (e.g., TNT, RDX, NDMA, etc.); pharmaceutical residuals (e.g., endocrine disruptors, estrogen, antibiotics, etc.); and/or pesticides (e.g., Dieldrin, Atrazine, IPC, 2,4-D, DDT, etc.), as well as others.

Hydroxyl radicals can be generated during processes involving the catalyzed activation of hydrogen peroxide using such metals as iron, copper, manganese, and/or other transition metal compounds. By far, the most commonly used metal is iron which, when used in the prescribed manner, results in the generation of highly reactive hydroxyl radicals. Iron solutions used as catalysts for this purpose typically include ferrous sulfate, ferric sulfate, ferrous chloride or ferric chloride, and are referred to herein as Fenton's catalysts—named after the chemist who first described the reaction. An example of Fenton-type chemical reaction systems employs ferrous salts and hydrogen peroxide in acidified (pH about 3-6) water suspension, whereby the ferrous ion rapidly reduces hydrogen peroxide to primarily hydroxyl radicals, which can react with and degrade a target contaminant. The peroxide is broken down into a hydroxide ion and a hydroxyl free radical. The hydroxyl free radical is the primary oxidizing species and can be used to oxidize and break apart organic molecules. A further description of Fenton-type reactions is provided in "Fenton's Catalyst—Iron-Catalyzed Hydrogen Peroxide", which is published by US Peroxide, Laguna Niguel, Calif. and incorporated herein by reference.

The water treatment processes of the prior art use one of several available oxidizers that is added to a volume of water to be treated in a mixing tank at ambient temperature and pressures. Usually the tank is open top and the treatment process has a batch approach to the operation. The dosage of the reactants is high as the mixing energy is low and limited. When hydroxyl free radical is used as the oxidizing agent in the prior art batch processes, it is formed in the volume of water to be treated by adding the reactants into the water so that the reaction takes place in the batch tank, and the large volume of water dampens the effects of the extremely exothermic reaction. A significant drawback to the use of the prior art water treatment processes relying on oxidation technologies, including peroxide and hydroxyl technologies, is the high treatment costs associated with the high dosages of reactants needed to complete the oxidation of the organics to the backbone structure, i.e. the basic elements of carbon, nitrogen and water. In addition, achieving the acidic conditions (pH 3-6) preferred for hydroxyl radical production in the large volumes typical of batch processes can be problematic and highly inefficient.

SUMMARY OF THE INVENTION

Accordingly, the present invention provides continuous flow water treatment devices and methods that reduce the costs associated with the use of oxidizers in water treatment by maximizing mixing energy with pressure of the solution in a continuous flow system. In particular the present invention provides continuous flow water treatment devices and methods that employ hydroxyl free radicals as the oxidizing agent in the oxidative removal of contaminants from water by maximizing mixing energy in the presence of an instantaneous manufacture of the hydroxyl free radical. The devices, systems and methods of the present invention take a continuous flow approach to the treatment process while making the hydroxyl free radical instantaneously at or near an impeller of a high shear high-pressure system. This allows for excellent reaction energy, mixing energy and pressure to force the reaction to consume organics using greatly reduced dosages of reactants. The present invention also provides for the creation of a solution containing hydroxyl free radicals, referred to herein as a hydroxyl free radical impregnated solution, that can be utilized as a very strong and effective sanitizing solution for a multitude of sanitization applications.

In some aspects, the present invention provides a continuous flow water treatment system for decreasing organic contaminants in the water, comprising an inflow conduit in fluid communication with a source of water to be treated, a housing that defines a mixing chamber within the housing that is in fluid communication with the inflow conduit to receive a flow of said water to the mixing chamber, a first chemical injector mounted into either the inflow conduit or the housing and being in fluid communication with a source of peroxide solution for providing a flow of the peroxide solution into the flow of said water, a second chemical injector mounted into either the inflow conduit or housing and being in fluid communication with a source of metal ion solution for providing a flow of the metal ion solution into the flow of said water, whereby the peroxide solution and the metal ion solution in the flow of water react to produce hydroxyl free radicals as an oxidizing agent for the oxidation of the organic contaminants in said water, a driven impeller mounted within the mixing chamber for maintaining the flow of fluid through the system and for providing agitation to the fluid within the mixing chamber, an outflow conduit in fluid communication with the mixing chamber for expelling the fluid from the mixing chamber, and a valve connected to the outflow conduit operable to restrict the flow of fluid within the outflow conduit for pressurizing the fluid upstream of the valve and within the mixing chamber. The metal ion solution is preferably an iron solution, and more preferably a Fenton's catalyst, such as for example, ferrous sulfate, ferric sulfate, ferrous chloride or ferric chloride. The peroxide is preferably hydrogen peroxide.

In some embodiments, there may be provided a third chemical injector mounted into either the inflow conduit or the housing and being in fluid communication with a pH regulator for providing a flow of the pH regulator into the flow of said water for adjusting the pH of said water. The pH regulator may be $CO_2$ gas or an acidic or basic solution.

In some embodiments, a portion of the inflow conduit defines a reaction chamber, and the chemical injectors are mounted into the reaction chamber such that the hydrogen peroxide solution and the Fenton's catalyst solution are provided into the reaction chamber in close proximity. The chemical injectors may be mounted around the periphery of the inflow conduit adjacent the reactor chamber in a manner that each injector is at an angle to the inflow conduit and the discharge ends of the injectors meet at an apex that points downstream.

In some embodiments, the housing comprises a centrifugal pump casing that defines a pump chamber within the casing, wherein the pump chamber comprises the mixing chamber, the pump casing further includes a suction nozzle to which the inflow conduit is connected, and a discharge nozzle to which the outflow conduit is connected.

In some aspects, the present invention provides a continuous flow water treatment system for decreasing organic contaminants in the water comprising an inflow conduit in fluid communication with a source of water to be treated, a housing that defines a mixing chamber within the housing that is in fluid communication with the inflow conduit to receive a flow of said water to the mixing chamber, a driven impeller mounted within the mixing chamber for maintaining the flow of fluid through the system and for providing agitation to the fluid within the mixing chamber, an outflow conduit in fluid communication with the mixing chamber for expelling the fluid from the mixing chamber, a reduced flow recirculation conduit in fluid communication with the outflow conduit and the inflow conduit for providing a recirculation flow of fluid from the outflow conduit to the inflow conduit, a first chemical injector mounted into the recirculation conduit and being in fluid communication with a source of peroxide solution for providing a flow of the peroxide solution into the recirculation flow, a second chemical injector mounted into the recirculation conduit and being in fluid communication with a source of metal ion solution for providing a flow of the metal ion solution into the recirculation flow, whereby the peroxide solution and the metal ion solution in the recirculation flow react to produce hydroxyl free radicals as an oxidizing agent for the oxidation of the organic contaminants in said water, a valve connected to the outflow conduit downstream of the recirculation conduit, and operable to restrict the flow of fluid within the outflow conduit for pressurizing the fluid upstream of the valve and within the mixing chamber. The metal ion solution is preferably an iron solution, and more preferably a Fenton's catalyst, such as for example, ferrous sulfate, ferric sulfate, ferrous chloride or ferric chloride. The peroxide is preferably hydrogen peroxide.

In some embodiments there is provided a third chemical injector mounted into the recirculation conduit and being in fluid communication with a strong acid solution for providing a flow of the acid solution into the recirculation flow for lowering the pH of the water in said flow.

In some aspects, the present invention further provides a method of water treatment to decrease organic contaminants in the water comprising the steps of providing a continuous flow of water to be treated, providing a flow of a peroxide solution into the flow of water, providing a flow of a metal ion solution into the flow of water at a location proximate to the flow of peroxide solution to produce hydroxyl free radicals from the reaction of the peroxide solution with the metal ion solution, vigorously agitating the resultant hydroxyl free radical and water mixture in a pump chamber by a driven impeller to enhance the oxidation reaction of the organic contaminants by the hydroxyl free radicals, measuring the amount of remaining organic contaminants in the treated water flowing out of the pump chamber, and increasing the flow of the peroxide solution and the flow of metal ion solution if organic contaminants are detected in the treated water. The metal ion solution is preferably an iron solution, and more preferably a Fenton's catalyst, such as for example, ferrous sulfate, ferric sulfate, ferrous chloride or ferric chloride. The peroxide is preferably hydrogen peroxide. Some embodiments may further comprise the step of pressurizing the fluid within the pump chamber, which may comprise restricting the outflow of fluid from the pump chamber. Some embodiments may further include the step of adjusting the pH of the water at the location where the flow of hydrogen peroxide and Fenton's catalyst are provided to within the range of pH 2-6, or preferably with the range of pH 3-5, which may be carried out by providing a flow of a acid or base solution at said location at a rate sufficient to maintain the pH within said pH range.

In some aspects, the present invention further provides a system for the continuous flow production of a hydroxyl free radical impregnated fluid for use in treatment of organic wastes or the sanitization of surfaces or equipment contaminated by organic contaminants, the system comprising an outer conduit defining a lumen through which said fluid may flow, an inner conduit mounted within the outer conduit, the inner conduit defining a reaction chamber that is in fluid communication with the lumen of the outer conduit, a first chemical injector mounted into the inner conduit and being connected to a source of peroxide solution for providing a flow of the peroxide solution into the reaction chamber, a second chemical injector mounted into the inner conduit and being connected to a source of metal ion solution for providing a flow of the metal ion solution into the reaction chamber, whereby the peroxide solution and the metal ion solution react to produce hydroxyl free radicals which flow out of the reaction chamber into the lumen of the outer conduit to mix with and impregnate the fluid. In some embodiments, the inner conduit may have first and second ends, and one of said ends may be closed. Alternatively, both of said ends may be closed and the inner conduit may include a plurality of apertures that provide the fluid communication between the reaction chamber and the lumen of the outer conduit.

BRIEF DESCRIPTION OF THE DRAWINGS

For a better understanding of the present invention and to show more clearly how it may be carried into effect, reference will now be made by way of example to the accompanying drawings in which.

DETAILED DESCRIPTION

Figure 1:
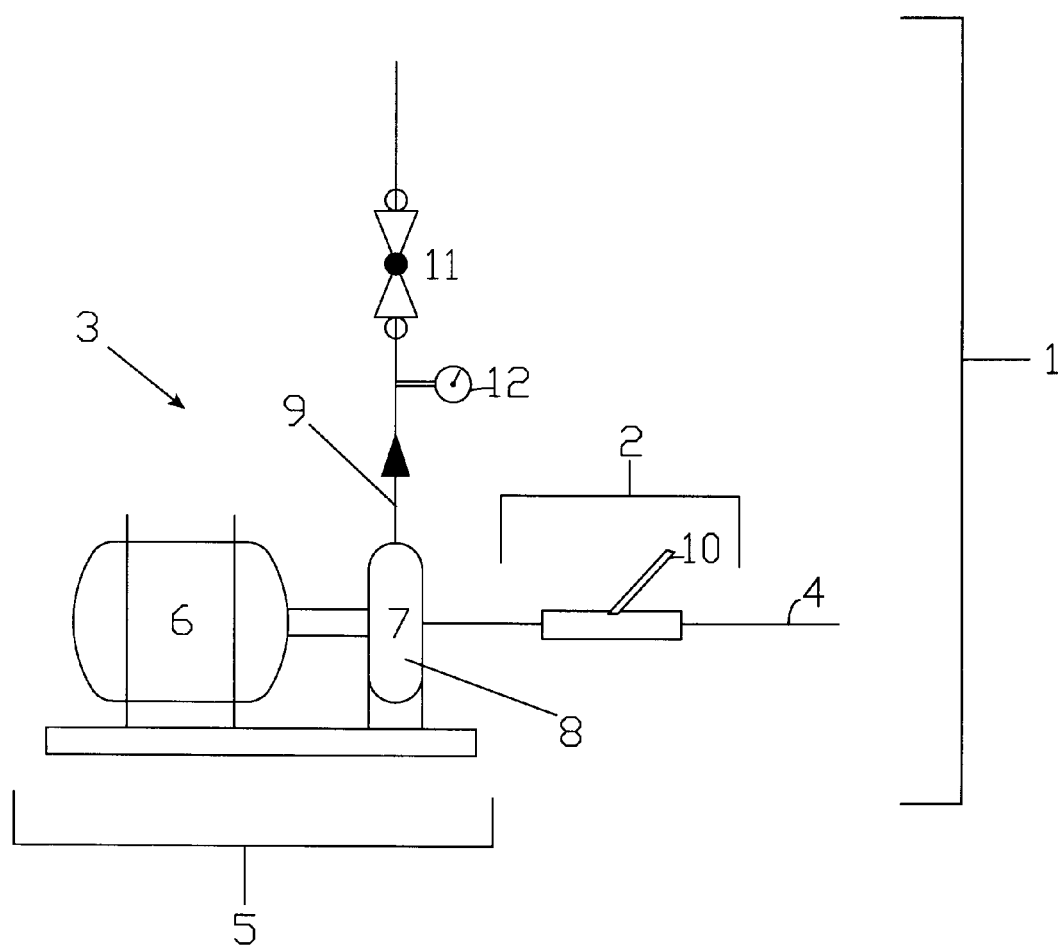
FIG. 1 is schematic diagram of an embodiment of a water treatment system in accordance with the present invention.

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

FIG. 1 schematically illustrates an embodiment of a continuous flow water treatment system 1 of the present invention that generally comprises an oxidizing agent injector apparatus 2 in which an oxidizing agent is injected into a stream of water to be treated and a high shear mixing apparatus 3 that imparts a very high mixing energy to the water flow into which the oxidizing agent has been injected to enhance the rate of oxidation of the contaminants in the water. More specifically, water treatment system 1 comprises a water infeed or inflow conduit or pipe 4 in fluid communication with the oxidizing agent injector apparatus 2 that is connected to and in fluid communication with an inlet or suction port or nozzle of pump 5. Pump 5 in the exemplary embodiment is a centrifugal pump comprising a motor 6 that drives impeller within the pump chamber 7 defined by the pump housing 8. An outlet or discharge port of the pump 5 is connected to and in fluid communication with an outflow conduit such as outlet pipe 9, which may lead to a settling/storage tank or pond (not shown) for the treated water, or in the alternative, which may lead directly to a discharge location for the treated water depending on the particular circumstances of the treatment process.

The oxidizing agent injector apparatus 2 includes one or more chemical injectors such as chemical injection quill 10 which provides a flow of oxidizing agent into the flow of water passing through the injector apparatus. Note that in some embodiments of the present invention, the injection quill 10 may be mounted directly into the pump housing 8 itself so as to invade into the pump chamber 7, in which case the oxidizing agent would be injected directly into the pump chamber. In such embodiments, the oxidizing agent injector apparatus and the high shear mixing apparatus would be combined.

The oxidizing agent may be any suitable oxidizing agent for removing contaminants to decrease the BOD/COD, such as for example, any of the oxidizing agents listed in Table 1. In the case of the oxidizers in Table 1 other than hydroxyl free radicals, one injector quill would be required for the supply of the oxidizer into the flow of water to be treated. Whereas, in the case of hydroxyl free radical, at least two injection quills are required for the simultaneous mixing of the reactants that produce hydroxyl free radicals: one for the peroxide and the other for the metal catalyst. In either case, additional injector quills may be provided depending on the specific chemistry of the oxidizing agent used. Thus, for example, an additional quill may be included to provide a pH regulator into the flow of water if the regulation of pH is important to the performance of the particular oxidizing agent used.

The water to be treated may be provided to the water treatment system 1 directly from a source of wastewater, or it may be stored in a collection tank or pond until a desired volume of water is collected. The water to be treated is pumped into the inflow pipe 4 and into the oxidizing agent injector apparatus 2. As the water flows past the chemical injection quills 10, the oxidizing agent is injected into the water stream and available for the oxidation of the organic compounds in the wastewater. This mixture then enters into the pump chamber 7 where the action of impeller of pump 5 creates high shear forces on the mixture to cause thorough mixing of the oxidizing agent with the organic compounds in the wastewater to increase the rate of oxidation of the organic compounds. Accordingly, the pump chamber 7 functions as a mixing chamber in which a driven impeller provides agitation to the fluid within it.

In the illustrated embodiment of the present invention depicted in FIG. 1, the oxidation of the wastewater by the oxidizing agent begins at a point just down-stream of the injector quill 10 and continues as the oxidizing agent and wastewater mixture flows into the pump chamber 7 wherein the mixture is subjected to high shear forces by the impeller to further aid in the oxidation reaction. Most of the organic compounds in the wastewater are oxidized in the pump chamber 7, but some oxidation may take place in the outflow pipe 9 as well. Preferably, the outflow pipe 9 is pressurized to provide back pressure into the pump chamber 7 by means of valve 11 which restricts the flow of the oxidizing agent/water mixture out of the outflow pipe 9. The back pressure in the outflow pipe 9 forces the oxidizing agent/water mixture back onto the impeller of the pump and thereby subjects it to additional shear to further aid in the oxidation reaction. A pressure gauge 12 is provided in the outflow pipe to measure the back pressure so that it could be regulated by adjusting the flow of the fluid through valve 11. The pressure in the outflow pipe and the pump chamber may be varied and adjusted based on the desired removal rates of the constituents to be removed in the water. Generally speaking, higher pressures lead to faster and more thorough oxidation of the constituents down to their backbone structure, up to an optimal pressure beyond which further increases yield diminishing returns. For example, for readily oxidizable constituents, the pressure may be ambient pressure; whereas, for more difficult constituents, the pressure may be significantly higher. In practice, the pressure used will be one that provides the desired removal rate of the contaminants in the water.

After passing valve 11, the treated water may be pumped into one or more holding or settling tanks or ponds, by which time most if not all of the organic contaminants in the water stream will have been oxidized. The treated water may be analyzed to ensure that it meets the desired standards prior to discharge into the environment. Alternatively, under some circumstances, the treated water may be discharged directly into the environment after exiting from the continuous flow water treatment system 1.

Figure 2:
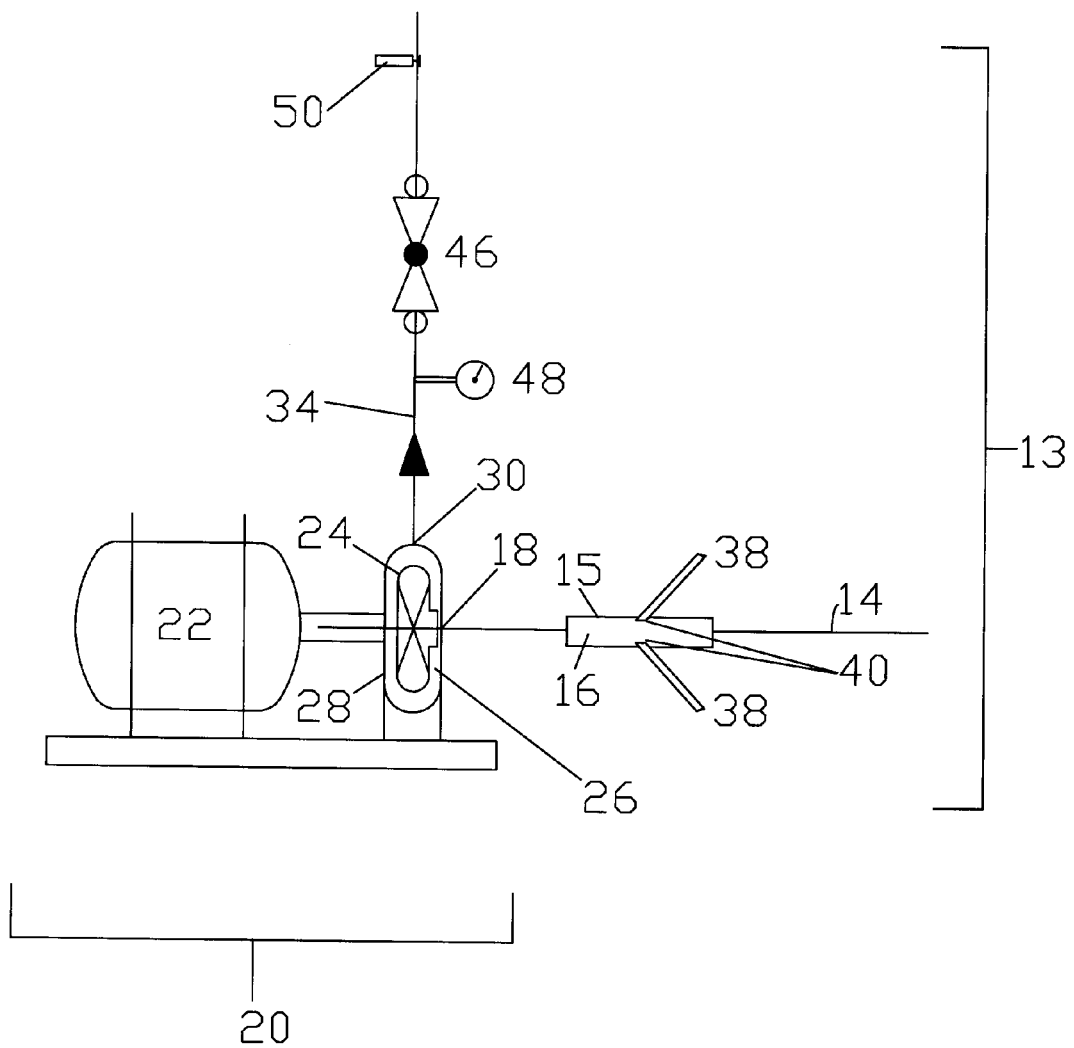
FIG. 2 is schematic diagram of another embodiment of a water treatment system in accordance with the present invention which is suited to using hydroxyl free radicals as the oxidizing agent.
Figure 3:
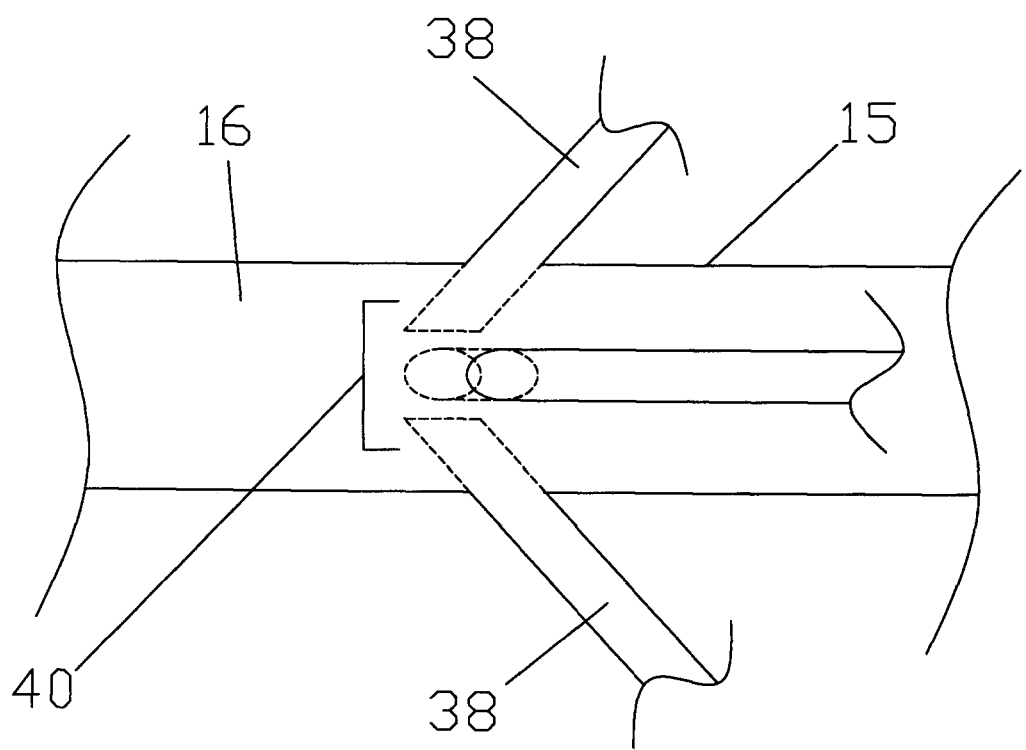
FIG. 3 is a schematic diagram of a reactor portion of the system in FIG. 2.

It will be appreciated that the overall pump design, the impeller design, the pump casing design and the speed of the impeller will have an impact on the efficiency of the oxidation reaction of the organic compounds by the oxidizing agent by affecting the shear forces (i.e. agitation) imparted to the fluid and hence the rate of mixing of the reactants. Designs that increase shear to produce a micro emulsion will generally result in higher rates of oxidation and are preferable. While the exemplary embodiments employ centrifugal pumps, it is to be appreciated that other pump designs are contemplated within the present invention. Also, increasing the pressure in the pump chamber results in higher rates of oxidation, up to an optimum pressure for any given constituent, and thus a range of pressures may be used in the present invention, FIGS. 2 & 3 schematically illustrate an embodiment of a continuous flow water treatment system of the present invention that employs hydroxyl free radicals as the oxidizing agent. A water treatment system 13 generally comprises a water infeed or inflow conduit or pipe 14 having a hydroxyl free radical producing reactor portion 15 defining reactor chamber 16 that is connected to and in fluid communication with an inlet or suction port or nozzle 18 of pump 20. Pump 20 in the exemplary embodiment is a centrifugal pump comprising a motor 22 that drives impeller 24 within the pump chamber 26 defined by the pump housing 28. An outlet or discharge port 30 of the pump is connected to and in fluid communication with an outflow conduit such as outlet pipe 34, which may lead to a settling/storage tank or pond (not shown) for the treated water, or in the alternative, which may lead directly to a discharge location for the treated water depending on the particular circumstances of the treatment process.

Referring to FIGS. 2 & 3, the reactor chamber 16 is provided with three chemical injectors such as chemical injection quills 38 positioned equidistant around the circumference of the reactor portion 15 and which invade the chamber 16 at an angle of approximately 60° to the horizontal such that the shafts of the three chemical injection quills point downstream. Note, however, that the positioning and the angles of the injection quills may be varied. One of the injection quills is connected to a source of peroxide, preferably hydrogen peroxide ($H_2O_2$), and injects the peroxide into the reaction chamber 16. The second injection quill is connected to the source of metal ion solution, preferably an iron solution, and even more preferably a Fenton's catalyst such as ferrous sulfate, ferric sulfate, ferrous chloride or ferric chloride, and injects the Fenton's catalyst into reactor chamber 16. The third injection quill is connected to a source of a pH regulator, such as pressurized $CO_2$ gas, and injects said $CO_2$ gas into the reactor chamber 16. However, other pH regulators such as acids or bases may be used.

The discharge end or outlet ports 40 of each chemical injection quill meet at an apex such that the $CO_2$, the Fenton's catalyst and the hydrogen peroxide are combined simultaneously at a point just upstream of the suction port 18 of the pump. However, in some embodiments of the present invention, the injection quills may be mounted into the pump housing itself so as to invade into the pump chamber 26 whereby the Fenton's catalyst, the hydrogen peroxide and $CO_2$ would be injected directly into the pump chamber.

The water to be treated may be provided to the water treatment system 13 directly from a source of water, or it may be stored in a collection tank or pond until a desired volume of water is collected. The water to be treated is pumped into the inflow pipe 14 and into the reactor chamber 16. As the water flows past the outlet ports 40 of the chemical injection quills 38, Fenton's catalyst, hydrogen peroxide and $CO_2$ are injected into the water. The Fenton's catalyst and the hydrogen peroxide react to yield hydroxyl radicals within the wastewater stream flowing past the apex in the reactor chamber 16. The hydroxyl radicals become available for the oxidation of the organic compounds in the wastewater as the fluid enters into the pump chamber 26 where the action of impeller 24 creates high shear forces on the fluid to cause thorough mixing of the hydroxyl radicals with the organic compounds in the wastewater to increase the rate of oxidation of the organic compounds. Accordingly, the pump chamber 26 functions as a mixing chamber in which a driven impeller provides agitation to the fluid within it.

The injection of $CO_2$ gas under pressure into the reactor chamber 16 is regulated to maintain the pH of the fluid entering the pump chamber 26 within a desirable range to enhance the oxidation of the organic compounds in the wastewater by the hydroxyl radicals. The injection of the $CO_2$ at or near the impeller means that the high shear forces on the water lead to good $CO_2$ gas distribution into the water and thus increased dissolved $CO_2$; therefore, $CO_2$ gas becomes a good pH regulator. Note that the injection of $CO_2$ gas is not required in some embodiments, or other pH regulators may be used, such as acids and bases, and others that would be apparent to persons skilled in the art.

In the illustrated embodiment of the present invention depicted in FIGS. 2 & 3, the oxidation of the wastewater by the hydroxyl free radicals begins at a point just down-stream of the apex and continues as the hydroxyl free radical and wastewater mixture flows into the pump chamber 26 wherein the mixture is subjected to high shear forces by the impeller 24 to further aid in the oxidation reaction. Most of the organic compounds in the wastewater are oxidized in the pump chamber 26, but some oxidation may take place in the outflow pipe 34 as well.

The outflow pipe 34 is pressurized to provide back pressure into the pump chamber 26 by means of valve 46 which restricts the flow of the hydroxyl free radical/water mixture out of the outflow pipe 34. The back pressure in the outflow pipe 34 forces the hydroxyl free radical/water mixture back onto the impeller 24 and thereby subjects it to additional shear to further aid in the oxidation reaction. A pressure gauge 48 is provided in the outflow pipe to measure the back pressure so that it could be regulated by adjusting the flow of the fluid through valve 46. The pressure in the outflow pipe and the pump chamber may be varied and adjusted based on the desired removal rates of the constituents to be removed in the water. Generally speaking, higher pressures lead to faster and more thorough oxidation of the constituents down to their backbone structure, up to an optimal pressure beyond which further increases yield diminishing returns. For example, for readily oxidizable constituents, the pressure may be ambient pressure; whereas, for more difficult constituents, the pressure may be significantly higher. In practice, the pressure used will be one that provides the desired removal rate of the contaminants in the water.

The outflow pipe 34 may be further provided with a dissolved oxygen (DO) sensor 50 for measuring the amount of oxygen in the fluid exiting the valve 46. It has been surprisingly discovered that the amount of Fenton's catalyst going into the reaction, and hence the oxidation of the organic contaminants themselves, can be effectively regulated by reference to the dissolved oxygen content of the water flowing out of the water treatment system 13. The measurements from DO sensor 50 may be used in a feedback control loop to adjust the amount of Fenton's catalyst being injected into the reactor chamber 16. For example, when the amount of dissolved oxygen falls below a threshold value, then the amount of Fenton's catalyst being injected into the reactor chamber is increased, resulting in more oxygen that is contributed from the hydroxyl reaction being dissolved into the wastewater stream. When the amount of dissolved oxygen increases beyond a threshold value, then the amount of Fenton's catalyst being injected into the reactor chamber is decreased, resulting in less oxygen that is contributed from the hydroxyl reaction being dissolved into the wastewater stream.

The measurement of the dissolved oxygen levels in the effluent from the water treatment system 13 may be important in some applications, particularly in cases where the treated water is to be expelled into an aquatic environment since the water must have a dissolved oxygen content within specific environmental guidelines in order for it to be allowed to be discharged into the environment. Typically, concentrations of dissolved oxygen below a 5.0 mg/l places aquatic life under stress; whereas, concentrations of dissolved oxygen above an allowable limit leads to oxygen toxicity in aquatic life, with a value of >12 usually being harmful to fish. By monitoring the dissolved oxygen in the discharge from the water treatment system, the present invention provides an efficient method for regulating the rate of the oxidation of the organics in a manner that yields water having dissolved oxygen within environmental limits for enabling discharge into the aquatic environment. In contrast, the prior art processes for regulating the reaction of the hydroxyl free radical oxidation of the wastewater rely on the measurements of the oxidation-reaction potential (ORP) in the treatment tank as a method of regulating the amount of Fenton's catalyst going into the reaction. While effective in ensuring that sufficient amounts of Fenton's catalyst is present to provide sufficient amounts of hydroxyl free radicals for complete oxidation of the contaminants in the wastewater, no provision is made in the prior art ORP based regulatory method for maintaining dissolved oxygen in the treated water within environmental regulatory standards. Nevertheless, under circumstances where the level of dissolved oxygen in the discharge stream is not important, such as in industrial applications, then an ORP based feedback loop may be used to control the amount of the reactants going into the systems of the present invention as well.

After passing valve 46, the treated water may be pumped into one or more settling tanks or ponds, by which time most if not all of the organic contaminants in the water stream will have been oxidized. The treated water in the tanks or ponds may be chemically analyzed to ensure that it meets environmental standards prior to discharge into the environment. Alternatively, under some circumstances, the treated water may be discharged directly into the environment.

It will be appreciated that the overall pump design, the impeller design, the pump casing design and the speed of the impeller will have an impact on the efficiency of the oxidation reaction of the organic compounds by the hydroxyl free radicals by affecting the shear forces (i.e. agitation) imparted to the fluid and hence the rate of mixing of the reactants. Designs that increase shear to produce a micro emulsion will generally result in higher rates of oxidation and are preferable. While the exemplary embodiments employ centrifugal pumps, it is to be appreciated that other pump designs are contemplated within the present invention. Also, increasing the pressure in the pump chamber results in higher rates of oxidation, up to an optimum pressure for any given constituent, and thus a range of pressures may be used in the present invention.

Example 1

A wastewater treatment system embodying the present invention was set up to treat 180,000 gallons of wastewater from a drilling operation using polymer technology and containing organic contaminants comprising high BOD, COD, and TOCs. The wastewater was pumped from a collection tank into a water treatment apparatus/bioreactor having a three-inch diameter inflow pipe that was connected to a four-inch diameter reactor chamber. The reactor chamber was connected to (thus just upstream from) the suction nozzle of a centrifugal pump having a 7-horsepower electric motor driving an open type impeller within a circular pump casing at a rate of 3400 revolutions per minute (RPM). The flow rate of the wastewater stream was maintained within a range of approximately 140-160 gallons per minute (GPM). The chemical injections quills were stainless steel and were mounted around the circumference of the wall of the reactor chamber at a rake angle of approximately 60° to the horizontal such that the shafts of the three chemical injection quills pointed downstream within the reactor chamber. One quill was connected to a source of ferric chloride (the Fenton's catalyst) which was pumped into the reactor chamber at a flow rate of 0.5 gallons per hour (GPH). A second quill was connected to a source of hydrogen peroxide solution which was pumped into the reactor chamber at a flow rate of 1 gallon per hour (GPH). The third quill was connected to a cylinder of pressurized $CO_2$ gas which was provided into the reactor chamber to regulate the pH in the reactor chamber. The flow of $CO_2$ was regulated to maintaining a pH in the approximate range of 6.8-7.5 of the water mixture entering the pump casing, which is a desirable pH range for the oxidation reaction of the organic compounds in the wastewater. Thus, the Fenton's catalyst and hydrogen peroxide reaction took place within this pH range and yielded sufficient amounts of hydroxyl radicals to completely oxidize the organics in the wastewater. A three-inch outflow pipe was connected to the discharge nozzle of the pump casing and a valve was provided in the outflow pipe at a distance of approximately 6 feet from the discharge nozzle. The valve was adjusted to maintain a back pressure in the outflow pipe of approximately 32 pounds per square inch (PSI). The close proximity of the reactor chamber to the pump casing meant that the manufacture of the hydroxyl free radical (i.e. the reaction of the Fenton's catalyst and the hydrogen peroxide) occurred primarily within the pump casing at the impeller, which provided the agitation for the reaction.

Table 2 shows the levels of the organic contaminants in the wastewater prior to and after treatment in a bioreactor made and operated in accordance with the above parameters. As can be seen therefrom, all of the organic contaminants were oxidized to their backbone structure to yield treated water having <20 mg/L COD.

TABLE 2

|  | Untreated | Treated |
| --- | --- | --- |
| BOD | 2,190 mg/L | <5 mg/L Non Detect |
| COD | 3,500 mg/L | <20 mg/L Non Detect |

Figure 4:
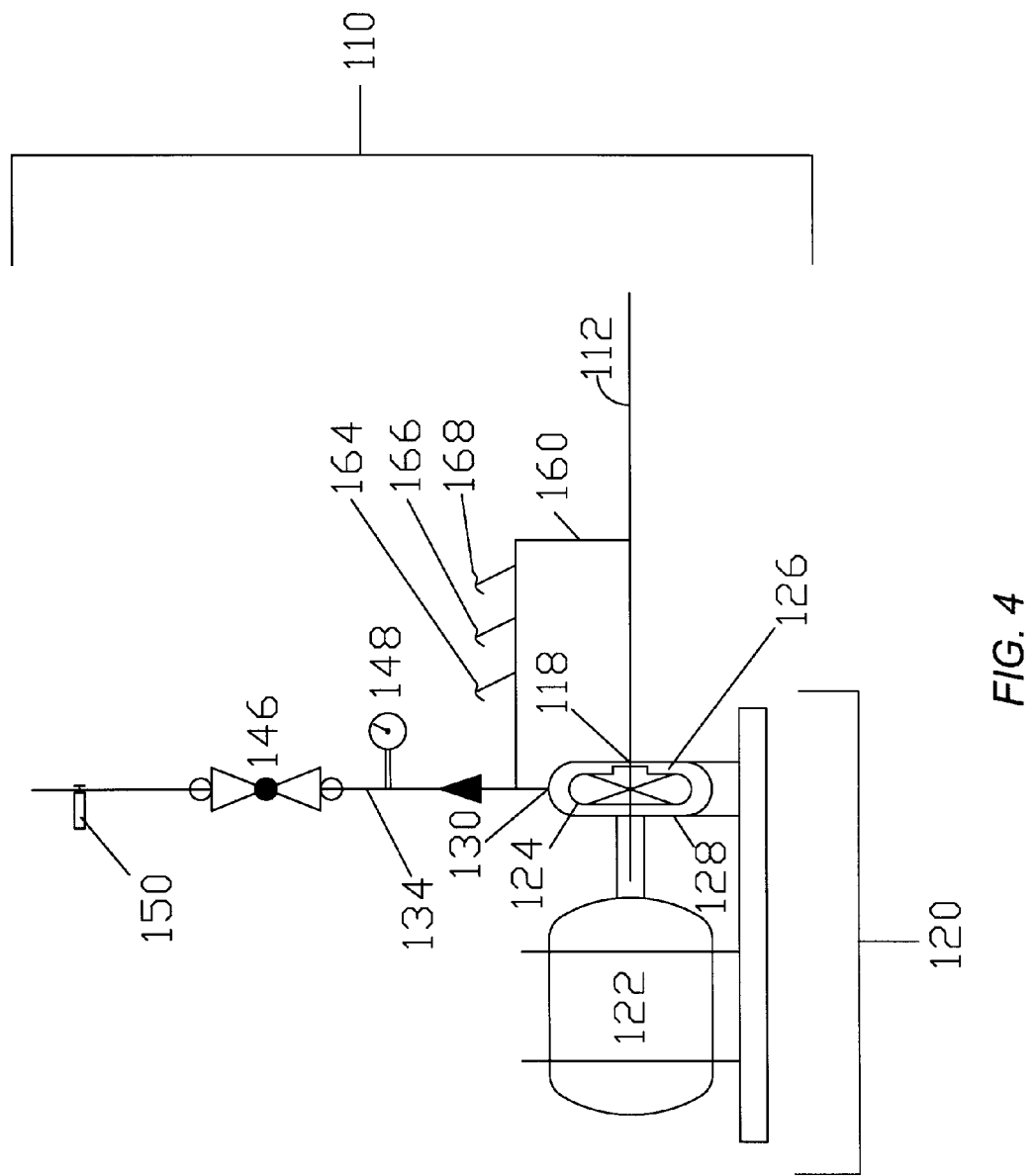
FIG. 4 is a schematic diagram of another embodiment of a water treatment system in accordance with the present invention.

Referring to FIG. 4, there is illustrated a schematic of another embodiment of a water treatment system or bioreactor in accordance with the present invention. A bioreactor indicated at 110 generally comprises a water infeed or inflow conduit or pipe 112 which is connected to and in fluid communication with an inlet or suction port or nozzle 118 of pump 120. Pump 120 in the present embodiment is a centrifugal pump comprising a motor 122 that drives impeller 124 within the pump chamber 126 defined by casing 128. An outlet or discharge port or nozzle 130 of the pump is connected to and in fluid communication with an outlet pipe 134 which preferably leads to a settling tank or a storage tank (not shown). A valve 146 is provided on the outlet pipe 134 for regulating fluid flow and thereby providing back pressure within the outlet pipe between the pump chamber 126 and valve 134. A reduced flow recirculation conduit 160 having smaller internal dimensions than the inflow and outflow pipes branches off the outflow pipe 134 at a location between the discharge nozzle 130 and the valve 146, and connects with the inflow pipe 112 at a location before the suction nozzle 118 of the pump. The recirculation conduit 160 maintains fluid communication between the outflow pipe and the inflow pipe and thereby provides a reduced fluid flow from the higher pressure outflow pipe to the lower pressure inflow pipe. Recirculation conduit 160 is provided with chemical injection quills 164 and 166 which invade the conduit. The first of the injection quills 164 is connected to a source of hydrogen peroxide solution ($H_2O_2$) and injects the peroxide into the conduit 160. The second injection quill is connected to a source of Fenton's catalyst, such as ferrous sulfate, ferric sulfate, ferrous chloride or ferric chloride, and injects the Fenton's catalyst into the conduit 160. The Fenton's catalyst and the hydrogen peroxide are thereby combined in the recirculation conduit 160, which functions as a reaction chamber in which the Fenton's catalyst and the hydrogen peroxide react to yield hydroxyl free radicals that are mixed with the water stream flowing in the recirculation conduit, and expelled back into the main wastewater stream of the inflow pipe 112 and into the pump chamber 126 where the hydroxyl free radicals are available for the oxidation of the organic compounds under the agitation action of impeller 124.

The embodiment illustrated in FIG. 4 may be preferred over the previously described embodiment of FIG. 2 in applications where high wastewater flow rates—hence treatment rates—are required, which necessitates employing a more powerful pump, such, for example, a 40 HP centrifugal pump capable of operating at 700 GPM. A more powerful pump can lead to relatively large suction being created within the inflow pipe, which can overpower the metering pumps for the Fenton's catalyst and hydrogen peroxide solutions, leading to inadvertent drawing in of too much of these reactants into reaction chamber 16 of the embodiment illustrated in FIG. 2. Under these circumstances, the recirculation conduit of the embodiment illustrated in FIG. 4 provides a positive pressure environment into which these reactants may be accurately metered.

Again referring to FIG. 4, a third injection quill 168 may be provided into the recirculation conduit 160 that is connected to a source of a pH regulator, such as an acid or base, for respectively lowering or raising the pH of the water flowing within the recirculation conduit 160 to the preferred range of pH 3-6 for the enhanced manufacture of the hydroxyl free radicals. The reduced volume within the recirculation conduit 160 allows the pH to me more readily managed therein. Beyond the recirculation conduit, maintaining a low pH value is less of concern since pH is important primarily in the peroxide and Fenton's catalyst reaction. This is a vast improvement over the prior art processes in which significant effort is directed towards maintaining the pH of an entire batch of wastewater to be treated within the prescribed pH range of 3-6 so that the peroxide and Fenton's catalyst reaction can take place to provide hydroxyl free radicals for the oxidation of the organic contaminants in the wastewater.

Accordingly, the manufacture of the hydroxyl free radical (i.e. the reaction of the Fenton's catalyst and the hydrogen peroxide) in the embodiment illustrated in FIG. 4 occurs primarily in the recirculation conduit 160. Since this reaction is strongly exothermic, it is important that the recirculation conduit be of a material that is capable of withstanding the elevated temperatures that result.

As with the previously described embodiment, the oxidation of the organic compounds in the wastewater by the hydroxyl free radicals take place primarily in the pump chamber wherein the mixture is subjected to high shear forces by the impeller to further aid in the oxidation reaction. And the outflow pipe 134 is pressurized to provide back pressure into the pump chamber 126 which forces the hydroxyl free radical and wastewater mixture back onto the impeller 124 and thereby subjects it to additional shear and agitation to further aid in the oxidation reaction. A pressure gauge 148 is provided in the outflow pipe to measure the back pressure so that it could be regulated by adjusting the flow of hydroxyl free radical/wastewater mixture through valve 146. As well, the outflow conduit 134 may be further provided with a dissolved oxygen (DO) sensor 150 for measuring the amount of oxygen in the fluid exiting the valve 146 and the measurement is used to adjust the amount of Fenton's catalyst being provided into recirculation conduit, hence the oxidation reaction of the organic contaminants.

An example of this described embodiment of a wastewater treatment system in accordance with the present invention that may be set up on an industrial scale to treat water having a number of organic contaminates. Typically, the wastewater would be first treated using prior art methods to remove heavy metals and suspended solids. Thereafter, the wastewater may be pumped into collection tanks and then into a water treatment apparatus constructed in accordance with the embodiment illustrated in FIG. 3 having a four-inch diameter inflow pipe that is connected the suction nozzle of a single stage end suction centrifugal pump having a 40 horsepower (HP) electric motor driving an open impeller within a circular pump casing at a rate of approximately 3500 revolutions per minute (RPM). The operational flow rate of the wastewater may be maintained at approximately 500 gallons per minute (GPM) hence approximately 30,000 gallons of wastewater may be treated every hour. A three-inch outflow pipe is connected to the discharge nozzle of the pump casing and a valve is provided in the outflow pipe at a distance of approximately 8 feet from the discharge nozzle. The valve may be adjusted to maintain a back pressure in the outflow pipe of approximately 45 pounds per square inch (PSI). A recirculation conduit comprised of ½ inch steel pipe branches off the outflow pipe at a position approximately two feet downstream from the discharge nozzle and reconnects with the inflow pipe at a position six inches upstream of the suction nozzle. The chemical injections quills may be stainless steel and may be mounted into the recirculation conduit. The first quill may be connected to a source of hydrogen peroxide solution which may be pumped into the recirculation conduit at a flow rate of 0.05 GPH (189.2 mL per hour). The second quill may be connected to a source of ferric chloride (the Fenton's catalyst) which may be pumped into the conduit at a flow rate of 0.03 GPH (i.e. 113 mL per hour).

In the various embodiments of the present invention, the peroxide may be hydrogen peroxide, calcium peroxide, and/or magnesium peroxide, and the like. The water to be treated may be groundwater, leachate, wastewater, sewer water, blackwater, graywater, bilge water, ballast water, feed water, process water, industrial water, irrigation water, recreational water, pond water, lake water, creek water, river water, rain water, runoff water, pool water, cooling water, non-potable water, potable water, drinking water, semi-pure water, and/or spent ultra-pure water, etc. The organic contaminant can be any hydrocarbon substance that can be oxidized, such as, for example, phenols, MTBE, BTEX (benzene-toluene-ethyl-benzene-xylenes), pesticides, solvents, plasticizers, chelants, chloroethenes, petroleum hydrocarbons, BOD and COD (biological oxygen demand/chemical oxygen demand) contributing compounds, and virtually any other organic requiring treatment. Further, hydroxyl radicals can disinfect process waters and biological effluents, and can decompose amino acids.

Generally, the purpose of the hydroxyl free radical producing reactor of the water treatment apparatus is to produce hydroxyl free radicals in situ as a continuous flow process and as efficiently as possible. To that end, other embodiments of hydroxyl free radical producing reactor portions are further described herein, but it is to be understood that other variations are contemplated.

Figure 5:
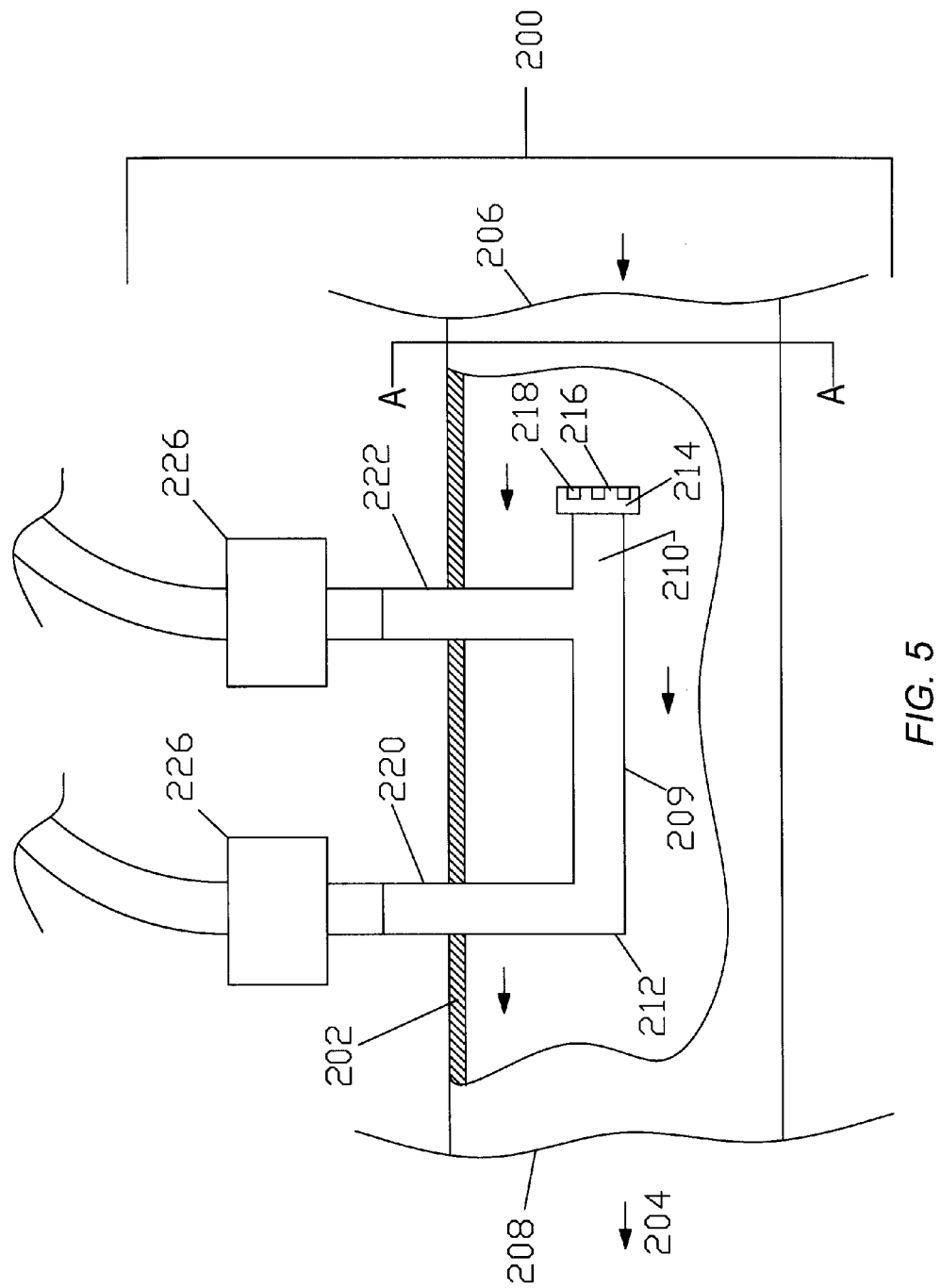
FIG. 5 is a side elevation of an embodiment of a hydroxyl free radical producing reactor showing the internal structure in a cutaway.
Figure 6:
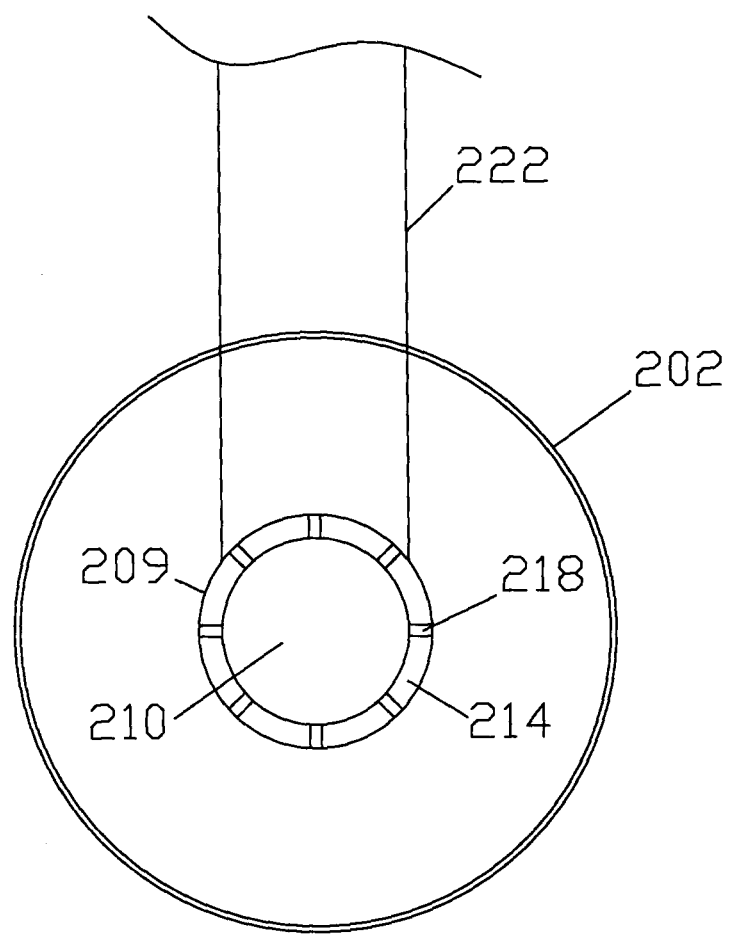
FIG. 6 is a cross section along A-A of the hydroxyl free radical producing reactor portion of FIG. 5.
Figure 7:
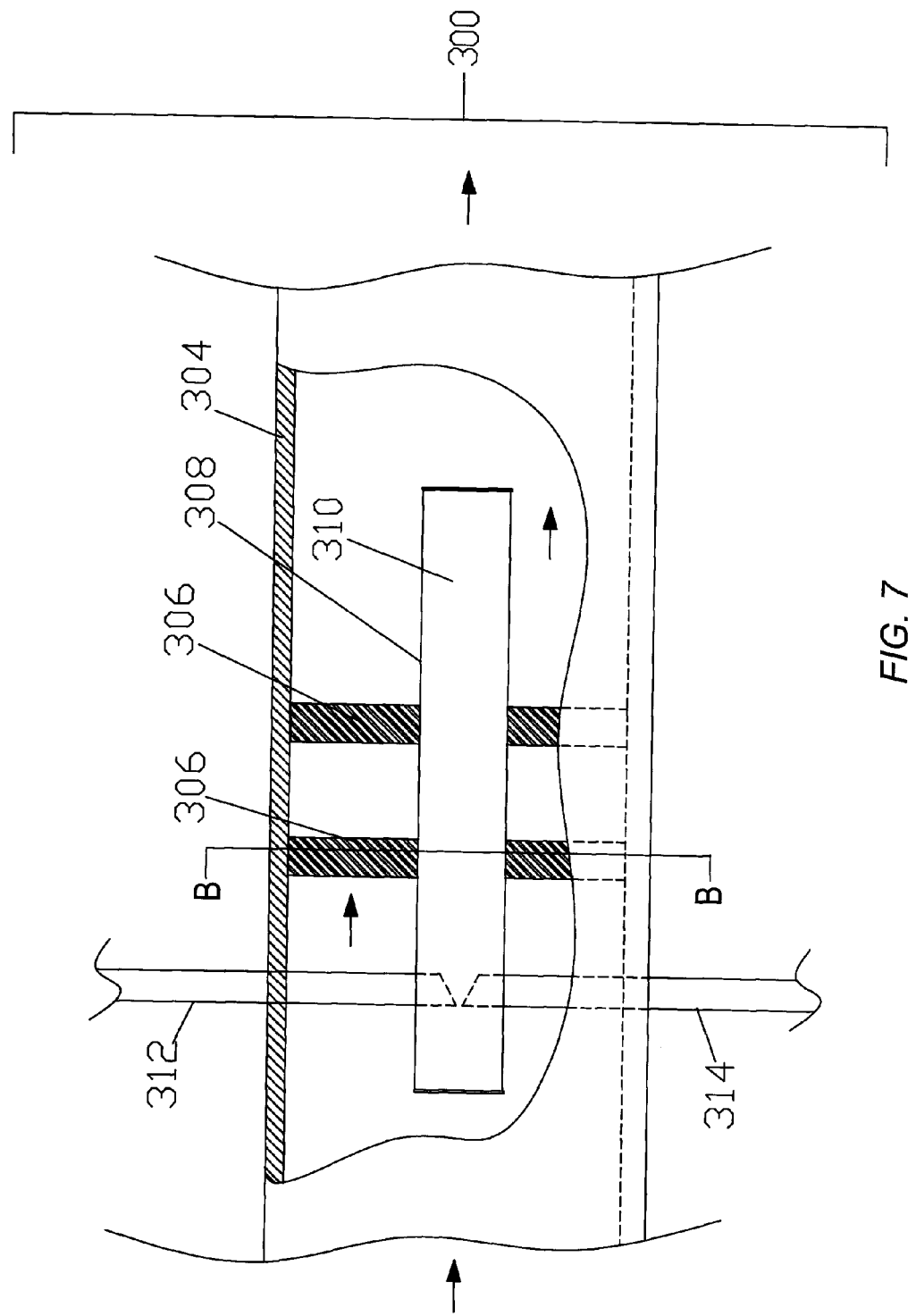
FIG. 7 is a schematic diagram of another embodiment of a hydroxyl free radical producing reactor portion.
Figure 8:
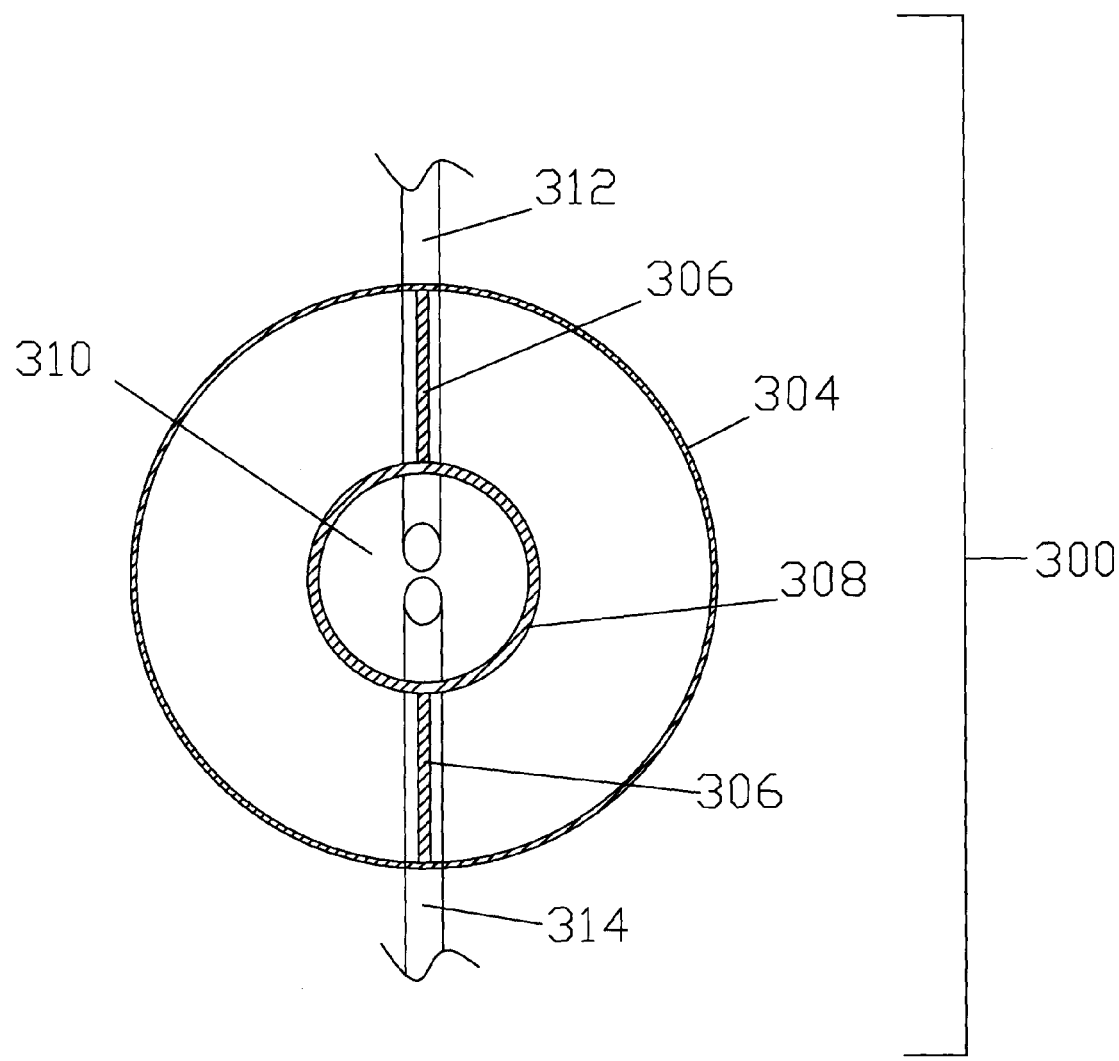
FIG. 8 is a schematic diagram cross section along B-B of the hydroxyl free radical producing reactor portion of FIG. 7.
Figure 9:
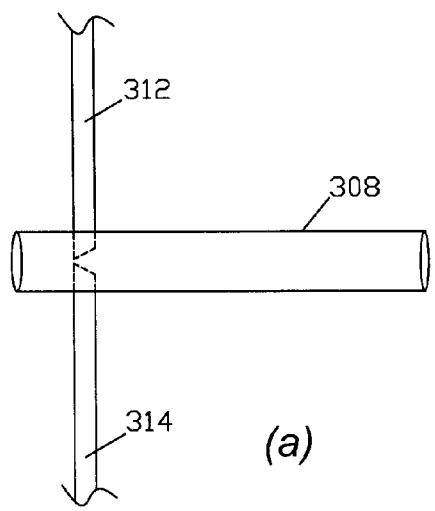
FIG. 9 includes schematic diagrams of other embodiments of inner conduits that may be used in a reactor portion of FIG. 7.
Figure 9:
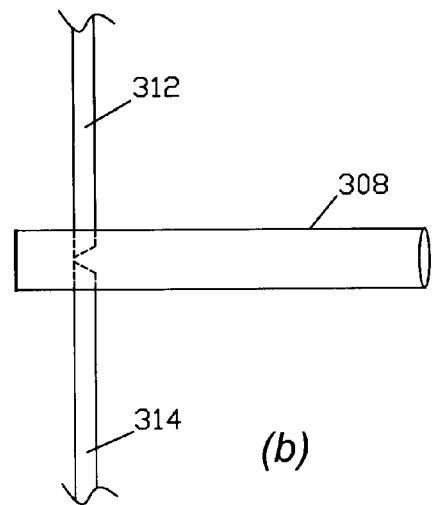
Figure 9:
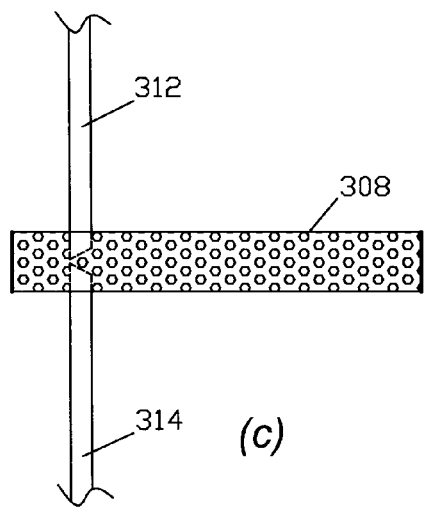

Referring to FIGS. 5 & 6, there is shown another embodiment of a hydroxyl free radical producing reactor 200 that may be employed in a continuous flow apparatus of the present invention to produce in situ hydroxyl free radicals in a continuous flow process from reacting a flow of hydrogen peroxide with a metal catalyst, such as ferric chloride solution. The reactor 200, when installed on the treatment apparatus, is in fluid communication with an inflow pipe, such as inflow pipe/conduit 14 of the apparatus illustrated in FIG. 2 or inflow pipe/conduit 112 of the apparatus illustrated in FIG. 4. The reactor portion 200 comprises an outer conduit 202 that is in fluid communication with the inflow conduit so that water flows in direction 204; thereby, upstream 206 and downstream 208 end portions are defined on the outer conduit 202. A coaxial inner conduit 209 is provided within the outer conduit 202 having a closed end 212 that faces the downstream end portion 208 and an open end 214 that faces the upstream end portion 206, and defining a reaction chamber 210. Open end 214 terminates in a circumferential edge 216 having a plurality of transverse grooves 218 thereon spaced equidistant along the circumference of the edge 216. A peroxide supply conduit 220 traverses the outer conduit 202 and connects with the inner conduit at closed end 212 to be in fluid communication with the reaction chamber 210. A metal catalyst supply conduit 222 traverses the outer conduit 202 and connects with the inner conduit towards open end 214 to be in fluid communication with the reaction chamber 210. Each of the supply conduits 220 and 222 include a combination anti-siphoning, relief, by-pass and back pressure valve 226 which opens at about 40 PSI of fluid pressure to allow fluid flow through the valve in the direction of the reaction chamber 210, but which does not allow flow in the opposite direction. An example of suitable valves for use as valve 226 are those distributed by Plast-O-Matic Valves Inc. of Cedar Grove, N.J., U.S.A. under the model series RVDT (http://www.plastomatic.com/rvdt.html). The outer conduit, the inner conduit and the supply conduits are preferably of stainless steel or other material that is chemically resistant to the reactants and to the heat produced by the exothermic reaction of the peroxide with the iron catalyst. The length of the inner conduit influences how much time the peroxide and iron catalyst have to react with each other before being diluted by the main water flow in the outer conduit, and hence influences the efficiency of converting the peroxide into hydroxyl free radicals. Accordingly, the length of the inner conduit may be varied to achieve a desired efficiency of conversion of peroxide to hydroxyl free radicals given a desired rate of flow of water through the reactor.

In operation, water flows through the reactor 200 in direction 204 and flows past the inner conduit 209. Hydrogen peroxide is pumped into the reaction chamber 210 via supply conduit 220 and Fenton's catalyst is pumped into the reaction chamber via the supply conduit 222, whereby the hydrogen peroxide and Fenton's catalyst react violently to produce hydroxyl free radicals that are expelled into the water flow in the outer conduit via open end 214 and are available to oxidize any contaminants in the water. The transverse grooves 218 evenly dissipate the flow of hydroxyl free radicals around the circumference of the open end 214. Advantageously, the heat generated by the highly exothermic reaction within the inner conduit is dissipated by the water flowing past it in the outer conduit. The valves 226 prevent the reactants to cross contaminate each others supply conduits thereby preventing the hazard of an explosive reaction taking place in the larger supply sources of the reactants. The anti-siphoning aspect of the valves 226 prevents excessive drawing of the reactants into the reaction chamber that would otherwise occur due to the siphoning effect of the relatively larger flow of water within the outer conduit passing by the open end 214. By way of example, in an embodiment of the hydroxyl free radical producing reactor 200 that is suited for use in a continuous flow water treatment system capable of handling flow rates of 50-250 gallons per minute, the outer conduit may be a stainless steel tube 2 inches in diameter and having threaded ends for use in coupling to a similarly sized inflow conduit. The inner conduit and the supply conduits may each be stainless steel tubing ⅜ inch in diameter. The supply conduits may pass through holes provided in the outer conduit spaced apart at an approximate distance of 2 inches and welded thereto, and may connect to the inner conduit by an elbow pipe connector in the case of the peroxide supply conduit and a T-connecter in the case of the iron catalyst conduit. The overall length of the inner conduit may be may be about 3-6 inches long. The break pressure at which the valves 226 open to allow the reactants to flow through the valves and into the inner conduit may be 40 PSI. Reactors suitable for use in systems having lower or higher flow rates may be provided by scaling these parameters down or up respectively.

Figure 10:
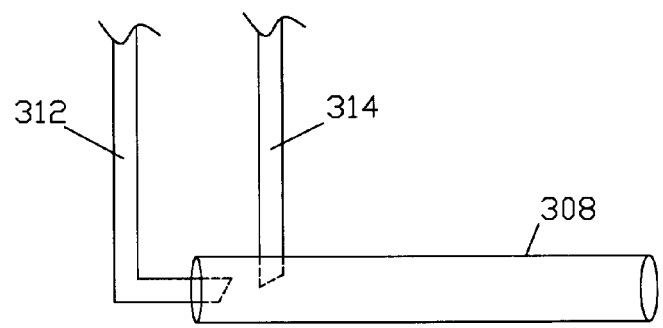
FIG. 10 is a schematic diagram of another embodiment of an inner conduit that may be used in the reactor portion of FIG. 7, showing and alternative arrangement of the chemical injectors.

Referring to FIGS. 7-10, there is shown other configurations of hydroxyl free radical producing reactors 300 that may be employed in the systems of the present invention to produce in situ hydroxyl free radicals in a continuous flow process by reacting a flow of hydrogen peroxide with a metal catalyst, such as ferric chloride solution. The reactor portion 300 is in fluid communication with an inflow pipe, such as inflow pipe/conduit 14 of the apparatus illustrated in FIG. 2 or inflow pipe/conduit 112 of the apparatus illustrated in FIG. 4. The reactor portion 300 comprises an outer conduit 304 that is in fluid communication with the inflow conduit, and an inner conduit 308 mounted by supports 306 within the outer conduit 304 and inline with the flow of water or other fluid therethrough, the inner conduit 308 defining a reaction chamber 310. The reaction chamber is in fluid communication with the flow of water through the outer conduit 304, either by having open ends as shown in FIG. 9a, having one open end and one closed end as shown in FIG. 9b, or by having closed ends but being perforated along it length as shown in FIG. 9c. The reactor chamber 310 is provided with two chemical injectors such as chemical injection quills 312 and 314 positioned around the circumference of the reactor portion 300 and which invade the chamber 310. The chemical injectors 312 and 314 are illustrated as being opposite each other, but they need not be so; they may be provided at varying locations and spacing relative to each other, for example, as shown in FIG. 10. One of the injection quills is connected to a source of peroxide, preferably hydrogen peroxide ($H_2O_2$), and injects the peroxide into the reaction chamber 310. The other injection quill is connected to the source of metal ion solution, preferably an iron solution, and even more preferably a Fenton's catalyst such as ferrous sulfate, ferric sulfate, ferrous chloride or ferric chloride, and injects the Fenton's catalyst into the reactor chamber 310. The highly exothermic reaction between the hydrogen peroxide and the Fenton's catalyst occurs within the inner conduit 308 to produce hydroxyl free radicals, which then flow into the flow of water within the outer conduit 304 and are available to oxidize contaminants therein. Advantageously, the flow of water around the inner conduit 308 cools the inner conduit to counter the heat generated by the hydrogen peroxide+Fenton's catalyst reaction, and the water that flows into the inner conduit upstream from the injector quills also dilutes the reactants to temper the violence of the reaction. The efficiency of the conversion of the reactants into hydroxyl free radicals may be controlled by increasing the reaction times, such as by increasing the length of the inner conduit 308, or by closing off one or both ends of the inner conduit, which reduces the flow of water into the inner conduit, and/or providing perforations therewithin to allow passage of the hydroxyl free radical solution out of the inner conduit. This reduced flow increases reactions time but results in a more violent reaction within the reaction chamber due to a lack of the dilution effect of such water flow. Construction of the outer conduit, inner conduit and chemical injectors may be of stainless steel or other material that is capable of withstanding the heat generated by the exothermic reaction, and which is also corrosion/oxidation resistant.

The embodiments of the inner conduits of the reactor portion illustrated in FIGS. 9b and 9c (as opposed to 9a) may be better suited to applications where high wastewater flow rates (hence treatment rates) are required, which necessitates employing a more powerful pump. A more powerful pump can lead to relatively large suction being created within the inflow pipe, which can overpower the metering pumps for the Fenton's catalyst and hydrogen peroxide solutions, leading to inadvertent drawing in of too much of these reactants. Under these circumstances, the closed ended inner conduit counteracts the suction created by the pump and provides an environment within the reaction chamber into which these reactants may be accurately metered.

The hydroxyl free radicals produced by embodiments of the present invention may be used in the oxidation of contaminants in the water flowing through the system as described above in relation to the water treatment devices. Alternatively, the hydroxyl free radicals that are produce in situ may be added to other treatment media, such as clean water, foams or other kinds of fluids, thereby impregnating these fluids with a strong oxidant, which may then be used to treat contaminants in other forms of media, such as contaminated sand, dirt, mud, and other solid, liquid or gas waste types, or in the sanitization of surfaces or equipment. In the latter applications, the system or apparatus exemplified by numerals 13 or 110 herein could be considered to be a continuous flow oxidizing agent impregnation system rather than a continuous flow water treatment system. For example, one could produce a hydroxyl concentrated stream that may be injected into water, soil, solids, plastic, and other media types that may be contaminated. As well, one could produce a concentrated heavy water solution that may be applied to other contaminated media for treatment, such as potline from aluminum manufacturing and the like.

Numerous embodiments of the invention are possible. The previous exemplary embodiments are intended to merely illustrate, and not limit, the breadth and depth of embodiments that can fall within the scope of the appended claims and future claims, which define the invention. For example, the apparatus will be scaled to accommodate different flow rates of the water to be treated or impregnated. The chemical flow rates, hence the concentration of the chemistry, and the pressure in the system may be adjusted depending on the contaminants to be treated and/or the particular application.

What is claimed is:

1. A continuous flow water treatment system comprising:
an outer conduit in fluid communication with a source of water to be treated wherein the outer conduit provides a continuous flow of water;
an inner conduit mounted within the outer conduit and in the continuous flow of water, the inner conduit defining a reaction zone that is in fluid communication with a lumen of the outer conduit;
a first chemical injector mounted into the inner conduit and being connected to a source of peroxide solution for providing a flow of the peroxide solution to the reaction zone;
a second chemical injector mounted into the inner conduit and being connected to a source of metal ion solution for providing a flow of the metal ion solution to the reaction zone, wherein the peroxide solution and the metal ion solution react in the reaction zone to produce hydroxyl free radicals that are expelled out of the reaction zone into the lumen of the outer conduit to mix with the continuous flow of water flowing by the inner conduit and the contaminants therein to oxidize the contaminants;
a mixer downstream of the reaction zone for agitating the water and free radical mixture for thoroughly distributing the free radicals in the water to enhance the oxidation of the contaminants; and
an outflow conduit in fluid communication with the mixer for expelling the treated water from the mixer.

2. The system as in claim 1, wherein the metal ion solution is an iron solution.

3. The system as in claim 2 wherein the peroxide solution is a hydrogen peroxide solution.

4. The system as in claim 1, wherein the inner conduit has a closed end and an opposite open end, and the injectors are proximate the closed end to define the reaction zone proximate to the closed end and remote from the surrounding flow of water, wherein the free radical formation occurs in the reaction zone prior to the free radicals being expelled from the open end into the continuous flow of water.

5. The system as in claim 4, wherein the metal ion solution is an iron solution.

6. The system as in claim 4, wherein the peroxide solution is a hydrogen peroxide solution.

7. The system as in claim 1, wherein the mixer comprises a driven impeller mounted within a housing for maintaining the continuous flow of water through the system and for providing agitation to the free radical and water mixture within the housing.

8. The system as in claim 7, further comprising a valve connected to the outflow conduit and operable to restrict the flow of water within the outflow conduit for pressurizing the fluid upstream of the valve and within the housing.

9. The system as in claim 8, wherein the metal ion solution is an iron solution.

10. The system as in claim 9 wherein the peroxide solution is a hydrogen peroxide solution.

\* \* \* \* \*